US007578594B2

(12) United States Patent
Souza et al.

(10) Patent No.: US 7,578,594 B2
(45) Date of Patent: Aug. 25, 2009

(54) ILLUMINATION SOURCE ACTIVATION BASED ON TEMPERATURE SENSING

(75) Inventors: Timothy Souza, Lebanon, OR (US); Daniel C Rudolph, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 710 days.

(21) Appl. No.: 11/190,259

(22) Filed: Jul. 26, 2005

(65) Prior Publication Data

US 2007/0024214 A1 Feb. 1, 2007

(51) Int. Cl.
*G03B 21/18* (2006.01)
*H01J 17/28* (2006.01)

(52) U.S. Cl. ........................... 353/52; 353/57; 315/117

(58) Field of Classification Search ............. 315/169.3, 315/169.4, 112, 117, 118; 362/359, 142–143, 362/373; 353/52, 57, 60, 61
See application file for complete search history.

(56) References Cited

U.S. PATENT DOCUMENTS

| | | | | |
|---|---|---|---|---|
| 6,120,152 | A * | 9/2000 | Nakayama et al. | 353/31 |
| 6,309,073 | B1 * | 10/2001 | Nakayama et al. | 353/38 |
| 6,467,911 | B1 * | 10/2002 | Ueyama et al. | 353/87 |
| 6,561,655 | B2 * | 5/2003 | Onishi et al. | 353/61 |
| 6,616,304 | B2 * | 9/2003 | Li | 362/302 |
| 7,229,177 | B2 * | 6/2007 | Nagano | 353/52 |
| 2003/0020884 | A1 | 1/2003 | Okada et al. | |

* cited by examiner

*Primary Examiner*—Douglas W Owens
*Assistant Examiner*—Minh D A

(57) ABSTRACT

A method for determining whether to activate an illumination source includes directing an air current across at least a portion of the illumination source and across at least a portion of a temperature sensor. The method also includes sensing the temperature of the air current with the temperature sensor and determining whether to activate the illumination source based on the temperature of the air current.

16 Claims, 3 Drawing Sheets

ILLUMINATION SOURCE ACTIVATION BASED ON TEMPERATURE SENSING

BACKGROUND OF THE INVENTION

High efficiency illumination sources, such as those used in projector systems, industrial lighting fixtures, stadium lighting, and so forth, may make use of a metal halide vapor that is electrically excited in order to produce light. To activate the illumination source, a ballast or other device is used to deliver a controlled current and voltage waveform to the illumination source. The waveforms typically begin with an initial high-voltage segment that activates the illumination source while the source is preferably in a “cold” state. Subsequently, the voltage delivered to the illumination source is reduced as the illumination source assumes steady-state operation.

When the input power to a high efficiency metal vapor illumination source is removed, sufficient time should be allowed before restarting the illumination source so that the metal halide vapor can be allowed to condense. If the illumination source is not allowed to sufficiently cool before being reactivated, the presence of a large voltage at the input to the source can cause a large current to flow through the metal halide vapor. These high-current and high-voltage events can damage the electrodes within the illumination source, thus causing the lamp to fail or to significantly reduce the operating life of the illumination source.

DESCRIPTION OF THE EMBODIMENTS

Embodiments of the invention can prevent damage to the illumination source caused by the user attempting to “hot start” a high efficiency metal halide vapor illumination source. This can be especially useful in low cost digital projector systems in which a premium is placed on maximizing the operating life of the illumination source. In these systems, the premature replacement of damaged or inoperative illumination sources can substantially increase the cost of ownership of the projector system.

Figure 1:
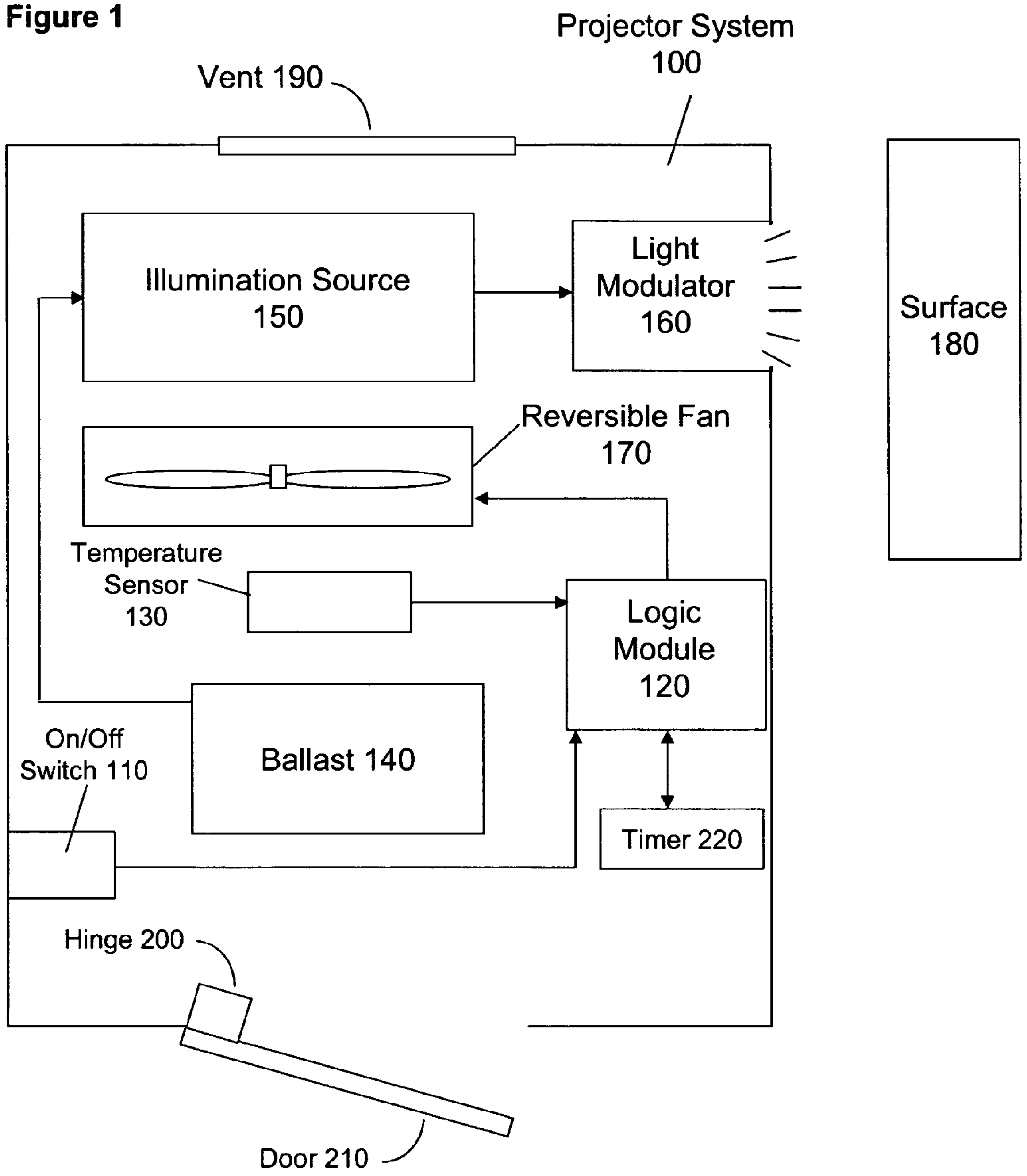
FIG. 1 is a block diagram of a system for activating an illumination source based on temperature sensing according to an embodiment of the invention.

FIG. 1 is a block diagram of a system for activating an illumination source based on temperature sensing according to an embodiment of the invention. In FIG. 1, projector system 100 represents a device for displaying images onto surface 180 modulated by way of light modulator 160. Projector system 100 may thus represent a digital entertainment device for use in the home, a digital projector for use in an enterprise, or may represent a variety of other display devices for use in the home or in commercial environments.

In projector system 100, illumination source 150 represents a high efficiency illumination source which may use mercury vapor or any other type of metal halide. However, it is contemplated that regardless of the precise nature of illumination source 150, the illumination source operates at an elevated temperature, thereby requiring (or at least benefiting from) reversible fan 170 directing an air current across at least a portion of illumination source 150. It is further contemplated that regardless of the precise nature of illumination source 150, the operating life of the source is degraded when the user attempts to activate the source prior to allowing sufficient time for the source to cool down from an elevated temperature resulting from previous use. This can occur when a user inadvertently depresses on/off switch 110, thereby removing power from illumination source 150, and then attempts to immediately reactivate the illumination source.

In the embodiment of FIG. 1, when a user attempts to activate illumination source 150, by way of depressing on/off switch 110, logic module 120 causes reversible fan 170 to direct an air current to flow from vent 190, across at least a portion of illumination source 150, and into contact with temperature sensor 130. Temperature sensor 130, in turn, measures the temperature of the air current and reports this measurement to logic module 120. In the event that the temperature of the air current is less than a predetermined value, logic module 120 determines that the illumination source 150 can be activated without damaging the illumination source. In turn, logic module 120 causes ballast 140 to begin conveying the appropriate voltage and current waveforms to activate illumination source 150.

In the event that the temperature of the air current is greater than a predetermined value, indicating that activating illumination source 150 may cause damage to the illumination source, logic module 120 delays the operation of ballast 140 to allow sufficient time for the illumination source to cool below a predetermined temperature. When logic module 120 determines that illumination source 150 can be safely activated, either by measuring real-time outputs of temperature 130, or by simply allowing reversible fan 170 to operate for a given length of time as determined by timer 220, logic module 120 causes ballast 140 to begin conveying the appropriate voltage and current waveform to activate illumination source 150. For most home entertainment and enterprise usage environments, is contemplated that the activation of illumination source 150 be delayed only by 10 to 15 seconds to allow the source to achieve a suitably low temperature.

After sensing the temperature of illumination source 150, reversible fan 170 directs air in an opposite direction in a manner that allows an air current to flow across at least a portion of ballast 140 and over illumination source 150. The air current is then directed outside of the enclosure of projector system 100 by way of vent 190. By way of this reversal in the direction of the air current, the operating temperature of ballast 140 can be sensed using temperature sensor 130. It is contemplated that by way of sensing the temperature of ballast 140, logic module 120 can assess the general condition of ballast 140. Thus, in the event that illumination source 150 is drawing excessive current, indicating the irregular or unusual operation of illumination source 150, this condition can be detected by way of sensing the temperature of ballast 140. Logic module 120 may then determine that ballast 140 should be switched off so as to prevent damage to the ballast or to limit damage to the illumination source.

The embodiment of FIG. 1 also includes hinge 200 and door 210. Hinge 200 is contemplated as being spring loaded so as to maintain door 210 in a closed position during the steady-state operation of projector system 100. When the user selects to operate the projector system, thereby initiating the operation of reversible fan 170, the air current from illumination source 150 causes door 210 to open. This prevents heated air drawn from illumination source 150 from unnecessarily heating the additional projector system electronics (not shown) within the enclosure.

Figure 2:
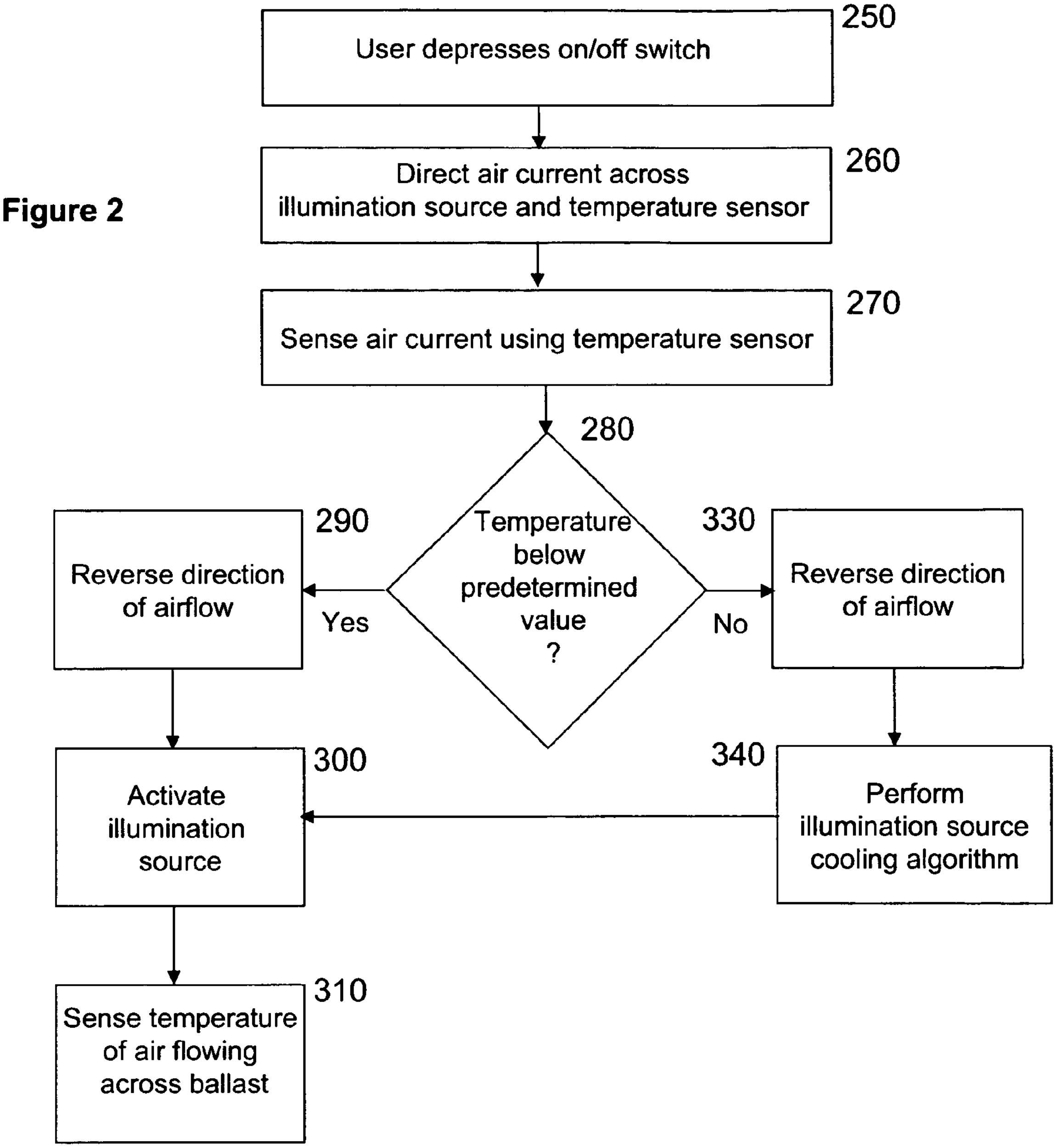
FIG. 2 is a method performed within a system for activating an illumination source based on temperature sensing according to an embodiment of the invention.

FIG. 2 is a method performed within a system for activating an illumination source based on temperature sensing according to an embodiment of the invention. The apparatus of FIG. 1 is suitable for performing the method of FIG. 2, although other equipment may be used as well. The method of FIG. 2 begins at step 250, in which a user depresses an on/off switch to initiate operation of the illumination source. At step 260, an air current is directed across at least a portion of the illumination source, and across at least a portion of a temperature sensor. At step 270 the temperature of the air current is sensed using the temperature sensor. At step 280 a decision is made as to whether to activate the illumination source based on the temperature of the air current sensed in step 270.

In the event that the temperature of the air current is below a predetermined value, step 290 is performed in which the direction of the airflow is reversed. The reversal in the direction of the airflow of step 290 represents the steady-state operating condition in which air is directed to remove heat from locations inside the projector or display system to a location external to the enclosure. In step 300, the illumination source is activated, perhaps by applying a high voltage signal to the illumination source. At step 310, the temperature of the air flowing across the ballast is sensed. As mentioned in reference to FIG. 1, sensing the temperature of the ballast may advantageously provide an indication of the general operating state of the ballast.

In the event that the outcome of step 280 indicates that the temperature of the illumination source is greater than a predetermined value, step 330 is performed in which the direction of the airflow is reversed. As mentioned in reference to step 290, the reversal in the direction of the airflow represents the steady-state operating condition in which air is directed in manner that removes heat from locations inside the projector or display system to a location external to the enclosure. Step 340 is then performed in which, perhaps as a function of the measured temperature of the air flow from the illumination source, an illumination source cooling algorithm is performed. In some embodiments of the invention, the algorithm may be as simple as delaying step 300, in which the illumination source is activated, for 10 or 15 seconds to allow the illumination source to cool. Other embodiments of the invention may include delaying performing step 300 for a variable period of time as a function of the temperature sensed at step 270. After the illumination source is activated in step 300, step 310 is performed in which the temperature of the air flowing across the ballast is measured.

In some embodiments of the invention, not all of the steps of FIG. 2 need be performed. In one embodiment, a method for determining whether to activate an illumination source may only include directing an air current across the illumination source and across a temperature sensor (step 260), sensing the temperature of the air current with the temperature sensor (step 270), and determining whether to activate the illumination source based on the sensed temperature of the air current (step 280).

Figure 3:
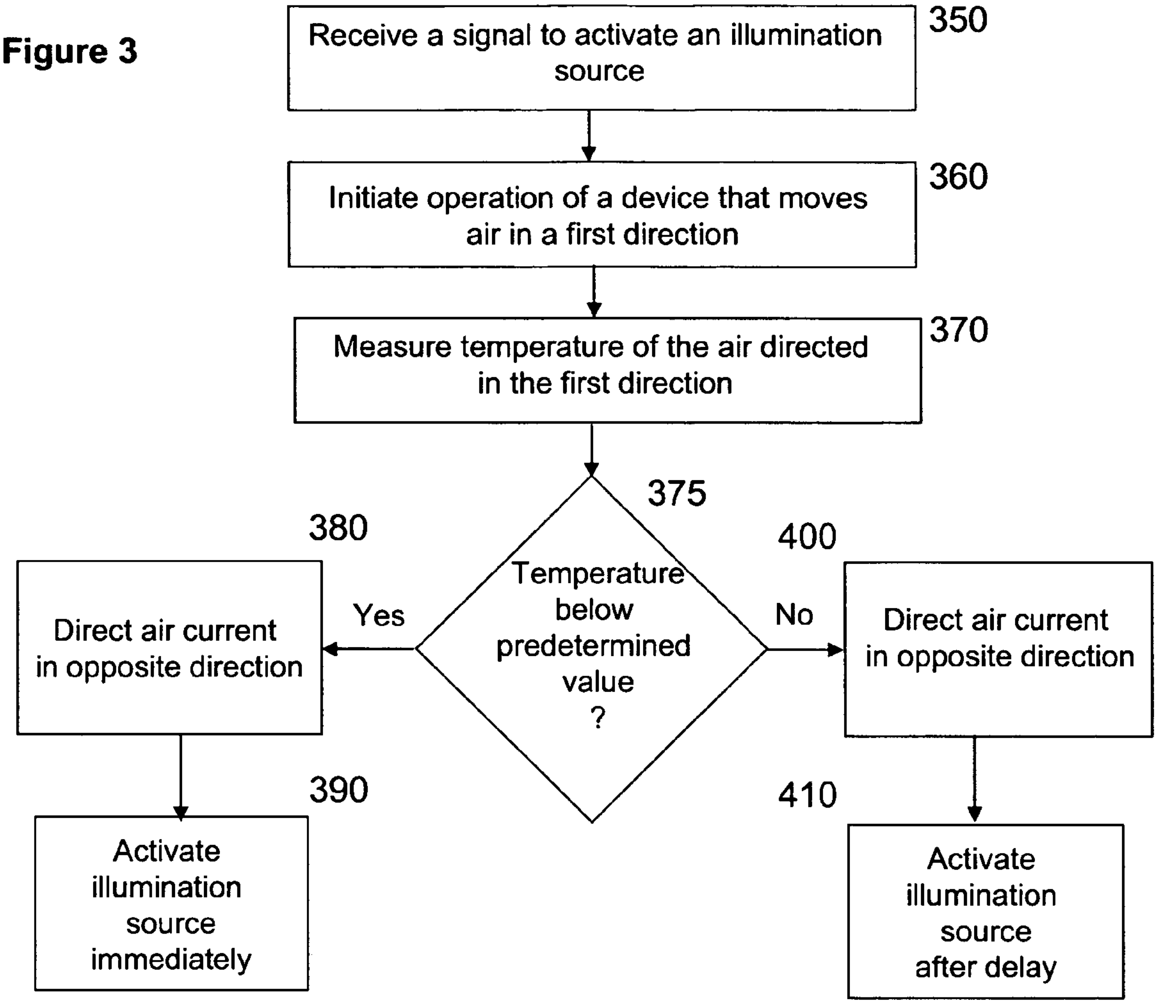
FIG. 3 is a method performed within a logic module in a system for activating an illumination source based on temperature sensing according to an embodiment of the invention.

FIG. 3 is a method performed within a logic module in a system for activating an illumination source based on temperature sensing according to an embodiment of the invention. The logic module (120) as used in FIG. 1 may be suitable for performing the method of FIG. 3 although the method may be performed using any combination of hardware and software modules. The method of FIG. 3 begins at step 350 in which the logic module receives a signal to activate the illumination source. Step 350 may occur in response to a user depressing an on/off switch of a projector system of which the logic module is a component.

In response to receiving the signal of step 350, step 360 is performed in which the logic module initiates operation of a device that directs air in a first direction, such as reversible fan 170 of FIG. 1. Step 370 is then performed, which includes measuring the temperature of the air directed in the first direction. At step 375, a decision is made as to whether or not the temperature is below a predetermined value. In the event that step 375 indicates that the temperature of the illumination source is below a predetermined value, step 380 is performed in which the operation of the device that directs air in the first direction is modified in order to direct the air in a second direction opposite the first direction. Step 390 is then performed in which the illumination source is activated immediately thereafter.

In the event that the decision of step 375 indicates that the illumination source is above a predetermined temperature, step 400 is performed, which includes directing the air current in the opposite direction so as to direct air from inside the enclosure housing the illumination source to a location outside of the enclosure. It is contemplated that in at least some embodiments of the invention, step 410 includes a fixed delay of 10 or more seconds before activating the illumination source. After the 10 or more seconds (or other fixed time period) has elapsed, the illumination source is activated.

In some embodiments of the invention, not all of the steps of FIG. 3 may be performed. In one embodiment, a method performed within a logic module may include only the steps of receiving a signal to activate the illumination source (step 350), and (responsive to the received signal) initiating operation of a device that directs air in a first direction (step 360), followed by measuring the temperature of the air directed in the first direction (step 370). The method may also include one of immediately activating the illumination source in the event that the temperature of the air is below a predetermined value (step 390) or activating the illumination source in the event that the temperature is above the predetermined value after a delay, as in step 410.

In conclusion, while the present invention has been particularly shown and described with reference to various embodiments, those skilled in the art will understand that many variations may be made therein without departing from the spirit and scope of the invention as defined in the following claims. This description of the invention should be understood to include the novel and non-obvious combinations of elements described herein, and claims may be presented in this or a later patent application to any novel and non-obvious combination of these elements. The foregoing embodiments are illustrative, and no single feature or element is essential to all possible combinations that may be claimed in this or a later patent application. Where the claims recite "a" or "a first" element or the equivalent thereof, such claims should be understood to include incorporation of one or more such elements, neither requiring nor excluding two or more such elements.

What is claimed is:

1. A method for determining whether to activate an illumination source, comprising:

directing an air current across at least a portion of the illumination source and across at least a portion of a temperature sensor;

sensing the temperature of the air current with the temperature sensor;

determining whether to activate the illumination source based on the sensed temperature of the air current; and initiating a timer that controls a delay, after which the illumination source should be activated, the initiating step being in response to the temperature of the air current being above a predetermined value.

2. The method of claim 1, wherein the delay is a function of the temperature of the air current.

3. The method of claim 1, wherein the delay is a fixed amount.

4. A device for displaying images, comprising:

a first electrical device;

a temperature sensor at the first electrical device;

a second electrical device, the second electrical device being positioned opposite from the first electrical device with respect to the temperature sensor;

a fan for reversibly directing air, the fan being interposed between the first electrical device and the second electrical device;

wherein the fan is configured to reversibly direct air current across at least a portion of the first electrical device and across at least a portion of the temperature sensor, and detect the temperature of the first electrical device, and wherein the fan is configured to reversibly direct air current across at least a portion of the second electrical device and across at least a portion of the temperature sensor, and detect the temperature of the second electrical device, and a hinged door for directing air from an illumination source to a location external to the device for displaying images after the air is directed towards the temperature sensor.

5. A logic module for use in a device for displaying images, comprising:

an input for receiving a command to activate an illumination source;

an output for controlling a fan for directing air towards the illumination source and towards a temperature sensor; and logic for determining whether to activate the illumination source based on an output of the temperature sensor, wherein an output of the temperature sensor indicating a low temperature causes the immediate activation of the illumination source, and an output of the temperature sensor indicating a high temperature causes the illumination source to be activated after a delay.

6. The logic module of claim 5, wherein the logic for determining whether to activate the illumination source further comprises logic for reversing the direction of the fan for directing air towards the illumination source and towards the temperature sensor, thereby causing the air to flow from the temperature sensor towards the illumination source.

7. The logic module of claim 5, wherein the output for controlling the fan for directing air towards the temperature sensor and the fan is capable of directing air in a forward and in a reverse direction.

8. The logic module of claim 5, wherein the delay is a period of at least 10 seconds.

9. In a logic module for use in a device for displaying images, a method for controlling when an illumination source is activated, comprising:

receiving a signal to activate the illumination source;

responsive to the received signal, initiating operation of a fan that directs air in a first direction;

measuring the temperature of the air directed in the first direction, and further including one of:

activating the illumination source in the event that the temperature of the air is below a predetermined value, and initiating a timer that delays activating the illumination source in the event that the temperature is above the predetermined value.

10. The method of claim 9, additionally comprising, after the activating step, modifying operation of the fan that directs air in the first direction to direct the air in a second direction that is opposite to the first direction.

11. The method of claim 9, wherein the activating step is performed immediately after the measuring step.

12. The method of claim 9, wherein the timer delays activating the illumination source for at least 10 seconds.

13. The method of claim 12, additionally comprising activating the illumination source after the at least 10 seconds has elapsed.

14. The method of claim 9, additionally comprising modifying operation of the fan that directs air in the first direction to direct the air in a second direction that is opposite to the first direction immediately following the measuring step.

15. A projector having an illumination source, comprising:

means for directing air to come into contact with the illumination source;

means for measuring the temperature of the air after the air has come into contact with the illumination source;

means for determining whether the illumination source should be activated based on an output from the means for measuring the temperature of the air; and means for determining that a specified time period has elapsed, the means for determining that the specified time period has elapsed being coupled to the means for directing air to come into contact with the illumination source.

16. The projector of claim 15, wherein the specified time period is a function of the temperature of the air.

* * * * *

UNITED STATES PATENT AND TRADEMARK OFFICE

CERTIFICATE OF CORRECTION

PATENT NO. : 7,578,594 B2
APPLICATION NO. : 11/190259
DATED : August 25, 2009
INVENTOR(S) : Timothy Souza et al.

It is certified that error appears in the above-identified patent and that said Letters Patent is hereby corrected as shown below:

In column 5, line 26, in Claim 4, delete "device," and insert -- device; --, therefor.

Signed and Sealed this

Eleventh Day of May, 2010

David J. Kappos
*Director of the United States Patent and Trademark Office*